United States Patent [19]

Bunting et al.

[11] Patent Number: 5,741,865

[45] Date of Patent: Apr. 21, 1998

[54] FATTY ALKLY DIETHANOLAMINES TO STABILIZE THE OPTICAL CLARITY OF POLYOLS CONTAINING ZINC FATTY ACID SALTS

[75] Inventors: Charles R. Bunting, Country Club Hills; Donald G. Zelhart, Palos Park, both of Ill.

[73] Assignee: Witco Corporation, Greenwich, Conn.

[21] Appl. No.: 503,886

[22] Filed: Jul. 18, 1995

[51] Int. Cl.$^6$ .................. C08L 67/02; C08L 71/02
[52] U.S. Cl. ............ 525/394; 525/360; 525/361; 525/362; 525/370; 525/379; 525/380; 525/382; 525/418
[58] Field of Search .................. 525/394, 361, 525/370, 380, 382

[56] References Cited

U.S. PATENT DOCUMENTS

| | | | |
|---|---|---|---|
| 4,370,388 | 1/1983 | Mito et al. | 428/461 |
| 4,397,916 | 8/1983 | Nagano | 428/461 |
| 4,519,965 | 5/1985 | Taylor et al. | 264/51 |
| 4,581,386 | 4/1986 | Taylor | 521/125 |
| 4,585,803 | 4/1986 | Nelson et al. | 521/105 |
| 4,612,252 | 9/1986 | Sagane et al. | 428/516 |
| 4,659,785 | 4/1987 | Nagano et al. | 525/324 |
| 4,668,753 | 5/1987 | Kashiwa et al. | 526/348 |
| 4,755,553 | 7/1988 | Kishimura et al. | 524/531 |
| 4,983,742 | 1/1991 | Yasawa et al. | 524/436 |
| 5,076,989 | 12/1991 | Dewhurst | 264/300 |
| 5,155,145 | 10/1992 | Foster et al. | 523/212 |
| 5,211,749 | 5/1993 | Dewhurst | 106/38.24 |
| 5,420,186 | 5/1995 | Dewhurst | 524/236 |
| 5,420,188 | 5/1995 | Dewhurst | 524/714 |

FOREIGN PATENT DOCUMENTS 2 101 140 A   1/1983   United Kingdom .

Primary Examiner—Fred Zitomer
Attorney, Agent, or Firm—Scully, Scott, Murphy & Presser

[57] ABSTRACT

The tendency to opacify of a polyol composition comprising one or more zinc fatty acid salts such as zinc stearate, added to form a mold release agent when the polyol is converted to a molded polyurethane article, is retarded by the presence of a small but effective amount of one or more fatty alkyl diethoxylate (e.g. diethanolamine) compounds.

11 Claims, No Drawings

FATTY ALKLY DIETHANOLAMINES TO STABILIZE THE OPTICAL CLARITY OF POLYOLS CONTAINING ZINC FATTY ACID SALTS

BACKGROUND OF THE INVENTION

The present invention relates to the stabilization of certain liquid organic compositions of matter against opacification, that is, against the tendency of such liquid compositions over time to lose optical clarity and/or to become progressively less translucent.

More specifically, the present invention relates to the treatment of liquid compositions of matter comprising polyols, and especially containing as well amine-terminated polyols, already containing as an additive one or more zinc salts of fatty acid, to retard the tendency of such compositions to opacify with the passage of time.

Polyols are used, among other things, in the synthesis of polyurethane polymers. In general, polyols, comprising one or a mixture of organic compounds substituted with two or more hydroxyl groups are reacted under appropriate conditions with isocyanates containing two or more isocyanate functionalities, with the reaction between the hydroxyl groups and the isocyanate functionalities leading to the formation as desired of a polymer network connected by urethane linkages. The resulting polymeric products are conventionally referred to as polyurethanes.

Solid articles, including both rigid objects as well as flexible and foamed articles, are often manufactured in molds wherein the polyol and isocyanate reactants, together with catalysts and other additives as desired, are combined in the mold whereupon the polyurethane that forms in that mold takes the shape of the desired article. Experience has shown, however, that the polyurethane material can tend to adhere to the inner surfaces of the mold with a tenacity such that removing the article from the mold can require application of considerable force, or can require the use of specialized tools and/or the disassembly of the mold itself. Accordingly, it is known to incorporate amongst the components that together form the polyurethane an effective amount of one or more "internal" mold release agents capable of reducing the adhesion between the formed polyurethane surface and the contiguous surface of the mold so that separation and removal of the polyurethane article from the mold are facilitated without undue complication and without damage to the surface of the polyurethane article. Among the compounds which have been found in practice to be effective mold release agents are zinc salts of fatty acids, typically saturated or unsaturated fatty acids containing 8 to 24 carbon atoms, one notable example of which is zinc stearate.

For instance, it is typical to incorporate a zinc fatty acid salt, such as zinc stearate, into the polyol component precursor of the reaction which forms the polyurethane. Unfortunately, it has been found that the presence of zinc salts of fatty acids, such as zinc stearate, even at the relatively low amounts on the order of 0.5 to 10 wt. % based on the polyol in which such mold release agents are present, appears to give to the polyol composition a tendency to opacify with the passage of time, over even one day or a few days. That is, the composition of matter comprising polyol and zinc fatty acid salt gradually loses translucency. This tendency is undesirable for several reasons. One reason is the aesthetic, in that a relatively hazy product will appear relatively unattractive to the customer and will suggest that the polyol component itself may also have suffered some degradation or loss of desired reactivity. In addition, the opacification may be due to some undefined interaction with the polyol itself, such that a relatively hazier product may well have a lower content of active polyol capable of entering into the desired reaction forming the polyurethane than is the case with a clear polyol composition. In addition, the haze is evidently due to the presence of a separate, denser or solid phase, which even if it is in the form of an ultrafine and dispersed solid may nonetheless interfere with processing and reactor equipment, lines, and valves, and may be expected to detract from the appearance and the property of the polyurethane product which is subsequently formed.

There thus remains a need for a technique for alleviating the tendency of polyol compositions containing zinc fatty acid salts to opacify over time. The present invention has been found to fulfill this need and to exhibit the other desired properties described herein.

BRIEF SUMMARY OF THE INVENTION

One aspect of the present invention comprises a process for retarding the tendency to opacify of a liquid composition of matter comprising polyol as the major component and which contains a zinc salt of a fatty acid, comprising forming a composition of matter comprising said polyol as the major component, the zinc salt of one or more fatty acids, and fatty alkyl diethoxylate such as diethanolamine in a small amount effective to retard said tendency to opacify.

Another aspect of the present invention is a composition of matter comprising one or more zinc salts of fatty acids, and fatty alkyl diethoxylate wherein the amount of fatty alkyl diethoxylate comprises about 1 to about 10% by weight of the amount of said one or more zinc salts of fatty acids.

Another aspect of the present invention is a composition of matter comprising a major amount of polyol, up to about 5 wt. % of zinc salt of fatty acid, and a fatty alkyl diethoxylate such as fatty alkyl diethanolamine in a small amount effective to retard the tendency of said composition of matter to opacify.

Other aspects of the invention, and preferred embodiments thereof, will be apparent herein.

DETAILED DESCRIPTION OF THE INVENTION

Polyol compositions with which the present invention is useful extend to any liquid composition containing any one or more polyols, wherein the presence of zinc stearate or other zinc fatty acid salt leads to gradual opacification over time, i.e. over the passage of up to thirty days. Such polyols, including blends of polyols, thus include polyols used in the synthesis of polyurethane.

These compounds may be divided into two groups, high molecular weight compounds having a molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of BF3 or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyester polyols which contain high molecular weight polyadducts or polycondensates in finely dispersed form or in solution may be used. Such modified polyether polyols are obtained when polyaddition reactions (e.g. reactions between polyisocyanates and amino functional compounds) or polycondensation (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952. Suitable polythioethers, polyacetate, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology", by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hoochtlen, Carl Hahset Verlag, Munich, 1966, pages 45–71.

Suitable aminopolyethers which may be used in accordance with the present invention as high molecular weight compounds (the molecular weight is always the average molecular weight which may be calculated from the functionality and the content of isocyanate-reactive groups) are those wherein at least about 30 and preferably about 60 to 100 equivalent % of the isocyanate-reactive groups are primary and/or secondary (preferably primary), aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (BE-PS 634,741). U.S. Pat. No. 3,654,370 describes the production of polyoxyalkylene polyamines by reaction of the corresponding polyol with ammonia and hydrogen in the presence of a nickel, copper, chromium catalyst. DE-PS 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728, and 3,236,895 and FR-PS 1,551,605. The production of polyethers containing terminal secondary amino groups is described, for example, in FR-PS 1,466,708.

Polyhydroxypolyethers of relatively high molecular weight may be converted into the corresponding anthranilic acid esters by reaction with isatoic acid anhydride, as described, or example, in DE-OS Nos. 2,019,432 and 2,619,840 and in U.S. Pat. Nos. 3,808,250, 3,975,428 and 4,016,143. Polyethers containing terminal aromatic amino groups are formed in this way.

According to DE-OS 2,546,536 and U.S. Pat. No. 3,865,791, relatively high molecular weight compounds containing terminal amino groups are obtained by reaction of NCO prepolymers based on polyhydroxypolyethers with prepolymers, aldimines or ketimines containing hydroxyl enamines, and subsequent hydrolysis.

Amino polyesters obtained by hydrolysis of compounds containing terminal isocyanate groups, for example in accordance with DE-OS 2,948,419 or U.S. Pat. No. 4,515,923, can also be present. In this process, polyethers most preferably containing 2 to 4 hydroxyl groups are reacted with polyisocyanates to form NCO prepolymers and, in a second step, the isocyanate groups are converted by hydrolysis into amino groups.

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds are used in admixture with up to about 95% by weight, preferably up to about 50% by weight, more preferably about 8 to 30% by weight and most preferably about 12 to 26% by weight, based on the total quantity of the high molecular weight compounds, of the low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, trimethylene glycol, tetraethylene glycol, trimethylene glycol, tetraethylene glycol, dipropylene glycol, tripropylene glycol, glycerol and trimethylol propane.

While not intending to be bound by any particular theory of the operation of the present invention, the tendency of such polyols to opacify over time when a zinc fatty acid salt such as zinc stearate is present in the polyol, is consistent with the theory that the zinc salt is relatively insoluble in the polyol (whether the polyol is but one structure or comprises a blend of two or more distinct compounds). Thus, the polyols to which the discovery of the present invention is applicable extend to any polyol compositions in which the amount of zinc fatty acid salt to be incorporated for its intended property as a mold release agent approaches or exceeds the solubility limit of the zinc fatty acid salt in the polyol composition. For practical purposes, this would mean any polyol compositions wherein the amount of the zinc fatty acid salt component is greater than 50% of its solubility limit in the polyol composition.

In these compositions of matter, the one or more polyol compounds can comprise the entire composition (other than the zinc fatty acid salt and the fatty amine derivative added in accordance with the present invention,) but it will be recognized that other components and diluents may be present as desired. In any event, the polyol component (which, as used herein, refers to the entirety of the one or more polyol compounds present) will constitute the major amount of the combination of matter, i.e. generally at least about 80 wt. %, preferably at least 90 wt. % and more preferably at least 95 wt. % of the composition to which the present invention is applied.

The zinc fatty acid salts customarily added to the polyol composition intended to function as a mold release agent for the subsequently formed polyurethane, comprise zinc salts of one or more fatty acids. As used herein, "fatty acids" refers to saturated and unsaturated, straight and branched carboxylic acids containing 8 to 24 carbon atoms. The most preferred of such zinc salts is zinc stearate. Other preferred zinc salts includes zinc palmitate, zinc laurate, and zinc octoate.

The amount of the zinc salt component depends generally on the characteristics of the particular polyurethane to be manufactured. Amounts of 0.1 wt. % to about 10 wt. % of zinc fatty acid salts, expressed as a weight percentage of the polyol composition, are typically employed. Preferred amounts of the zinc fatty acid salts are generally about 0.5 to 5 wt. %, and more preferably about 1 to about 4 wt. %.

The present invention uses to advantage a fatty amine diethoxylate component, by which is meant one or more compounds of the general formula R—N((—CH$_2$CH$_2$O)$_n$H)$_2$ wherein R denotes a straight-chain or branched-chain, saturated or unsaturated, alkyl or alkenyl chain containing 12 to 22 carbon atoms. Preferably, R denotes a stearyl chain. In the aforementioned formula each n is 1 to 5, and preferably 1. Thus, a most preferred diethoxylate is stearyl diethanol amine. Such compounds are generally commercially available, or can readily be synthesized from a corresponding alkyl amine by reaction with an appropriate stoichiometric amount of ethylene oxide.

The particular sequence of combination of fatty amine diethoxylate and zinc fatty acid salt to the polyol composition is not critical and addition may be carried out in any order convenient to the operator. A discrete product comprising a combination of one or more zinc salts of fatty acid and one or more fatty amine diethoxylate can be formed, by appropriate heating and stirring to a uniform distribution of the components. This product can then be thoroughly stirred into the polyol, with heating of the composition of matter as necessary to thoroughly liquify the composition, all so as to insure complete and uniform distribution of the zinc fatty acid salt and the fatty amine diethoxylate throughout the polyol composition. Alternatively, the zinc fatty acid salt and the fatty amine diethoxylate can each be stirred into the polyol composition under conditions selected to afford a thorough and uniform distribution of each component throughout the polyol composition. Heating may be necessary to improve the liquidity and aid the desired thorough distribution of components.

The amount of fatty amine diethoxylate should comprise a sufficient quantity so as to retard the aforementioned opacification of the polyol composition of matter containing the zinc fatty acid salt which would otherwise be observed. Generally, amounts of fatty amine diethoxylate on the order of about 1% to about 10% by weight of the amount of zinc fatty acid salt present will be useful. More typically, the ratio by weight of fatty amine diethoxylate to zinc fatty acid salt should preferably lie in the range of about 1:10 to 1:25.

Thus, it can be seen that the zinc fatty acid salt and the fatty amine diethoxylate comprise minor amounts of the polyol composition, each generally comprising from about 0.1 wt. % to about 5 wt. % thereof with the fatty amine diethoxylate itself comprising generally up to about 1 wt. % of the overall polyol composition.

The present invention is further described in the following Example, which is provided for purposes of illustration and is not intended to limit the scope of that which is regarded as the invention.

EXAMPLE

The tests described in this example evaluated the effect of adding fatty amine diethoxylate to samples of a polyol composition to which zinc fatty acid salt had also been added. The fatty amine diethoxylate was added to only certain samples, to compare the opacification with and without the addition of the fatty amine diethoxylate.

The procedure was as follows: a mold release concentrate was prepared which contained about 28.6 wt. % of zinc fatty acid salt, whose identity in each run is set forth in Table A below. Then, for each different concentrate, 80 grams of a polyol composition to be subsequently reacted in the synthesis of polyurethane was placed in an 8 ounce jar, after which 4 grams of the given mold release concentrate was added to the same jar and the contents were mixed together thoroughly until the mixture was completely clear and free of lines of convection, indicating uniformity of distribution of the components. Then, 20 grams of this mixture was placed into each of 3 sample bottles which were then capped securely and placed in an air-circulating oven preset to a constant temperature of 94° F. The samples were then checked daily, and the day upon which a sample was first seen to be hazy (indicating excessive opacity) was noted.

The results of each test are set forth below in Table A which shows the run number, the identity of the particular zinc fatty acid salt employed, and the number of days the sample was able to remain in the oven before it opacified.

TABLE A

| Test No. | Zinc Salt Composition | Days to Haze |
|---|---|---|
| 1 | Zinc Stearate | 5 |
| 2 | Zinc Stearate | 3 |
| 3 | Zinc Palmitate | 3 |
| 4 | Zinc Laurate | 20 |
| 5 | 95 wt. % zinc stearate/ 5 wt. % octoate | 4 |
| 6 | 90 wt. % zinc stearate/ 10 wt. % zinc laurate | 11 |
| 7 | 95 wt. % zinc stearate/ 5 wt. % gluconic acid | 3 |
| 8 | 95 wt. % zinc stearate/ 5 wt. % zinc laurate | 8 |
| 9 | 95 wt. % zinc stearate/ 5 wt. % stearyl diethanolamine | (did not become hazy) |
| 10 | Zinc stearate | 4 |
| 11 | 95 wt. % zinc stearate/ 5 wt. % stearyl diethanolamine | (did not become hazy) |

From these results it can clearly be seen that the presence of the fatty amine diethoxylate, in this case stearyl diethanolamine, greatly prolongs the ability of the polyol composition containing zinc stearate to remain clear, resisting opacification. Specifically, it can be seen that polyol compositions containing zinc stearate without fatty amine diethoxylate, such as compositions 1, 2, 3 and 10, became hazy and opacified within a few days, whereas compositions 9 and 11 which also contained the fatty amine diethoxylate did not become hazy during the time of the testing (that is, not in eight days or more). This improvement is clearly useful, and is as well quite unexpected.

What is claimed is:

1. A process for retarding the tendency to opacify of a liquid composition of matter comprising polyol as the major component, comprising admixing said polyol with one or more zinc salts of fatty acids containing 8 to 24 carbon atoms, and one or more fatty alkyl amine diethoxylates in a small amount effective to retard said tendency to opacify, wherein said fatty alkyl amine diethoxylates have the formula R—N((—CH$_2$CH$_2$O)$_n$H)$_2$ in which R is alkyl or alkenyl containing 12 to 22 carbon atoms, and n is 1 to 5.

2. The process of claim 1 wherein said one or more fatty alkyl amine diethoxylates are selected from the group consisting of fatty alkyl diethanolamines wherein the fatty alkyl substituent contains 12 to 22 carbon atoms.

3. The process of claim 2 wherein said one or more zinc salts of fatty acids, and said one or more fatty alkyl diethanolamines, each comprise 0.1 to 10 wt. % of said composition of matter.

4. The process of claim 3 wherein said composition of matter contains zinc stearate.

5. The process of claim 2 wherein said one or more zinc salts of fatty acid comprise up to about 5 wt. % of said composition of matter.

6. The process of claim 5 wherein said one or more fatty alkyl diethanolamines comprise up to about 5 wt. % of said composition of matter.

7. The process of claim 5 wherein said fatty alkyl diethanolamine is stearyl diethanolamine.

8. A process for retarding the tendency to opacify of a liquid composition of matter comprising at least about 95 wt. % of one or more polyols, comprising admixing said one or more polyols with one or more zinc salts of fatty acids containing 8 to 24 carbon atoms, and one or more fatty alkyl amine diethoxylates in a small amount effective to retard said tendency to opacify, wherein said fatty alkyl amine diethoxylates have the formula R—N((—CH$_2$CH$_2$O)$_n$H)$_2$ in which R is alkyl or alkenyl containing 12 to 22 carbon atoms, and n is 1 to 5.

9. A composition of matter comprising a major amount of polyol and further comprising more zinc salts of fatty acids containing 8 to 24 carbon atoms, and one or more fatty alkyl amine diethoxylates of the formula R—N((—CH$_2$CH$_2$O)$_n$H)$_2$ wherein R is alkyl or alkenyl containing 12 to 22 carbon atoms, and n is 1 to 5; in which said one or more fatty alkyl amine diethoxylates comprises about 1 to about 10% by weight of the amount of said one or more zinc salts of fatty acids and in which about 0.1 to about 10 wt. % of said composition of matter comprises said one or more zinc salts of fatty acids comprising 8 to 24 carbon atoms.

10. A composition of matter comprising a major amount of polyol and further comprising one or more zinc salts of fatty acids containing 8 to 24 carbon atoms, and one or more fatty alkyl diethanolamines wherein the fatty alkyl substituent contains 12–22 carbon atoms, in which said one or more fatty alkyl diethanolamines comprises about 1 to about 10% by weight of the amount of said one or more zinc salts of fatty acid and in which about 0.1 to about 10 wt. % of said composition of matter comprises said one or more zinc salts of fatty acids containing 8 to 24 carbon atoms.

11. A composition of matter according to claim 10 wherein said one or more zinc salts of fatty acids comprises zinc stearate.

* * * * *

UNITED STATES PATENT AND TRADEMARK OFFICE
CERTIFICATE OF CORRECTION

PATENT NO. : 5,741,865
DATED : April 21, 1998
INVENTOR(S) : Charles Bunting, et al.

It is certified that error appears in the above-identified patent and that said Letters Patent is hereby corrected as shown below:

Title page, item [56], Column 2, line 1: "Taylor" should read --Taylor et al.--

Column 3, line 1: "BF3" should read --$BF_3$--

Column 8, line 12, Claim 9 : "more" should read --one or more--

Column 8, line 27, Claim 10: "comprises" should read --comprise--

Signed and Sealed this

Sixth Day of February, 2001

*Attest:*

Q. TODD DICKINSON

*Attesting Officer*     *Director of Patents and Trademarks*